E. J. OETTER.
TIRE.
APPLICATION FILED MAR. 17, 1916.
1,226,580.
Patented May 15, 1917.
2 SHEETS—SHEET 1.
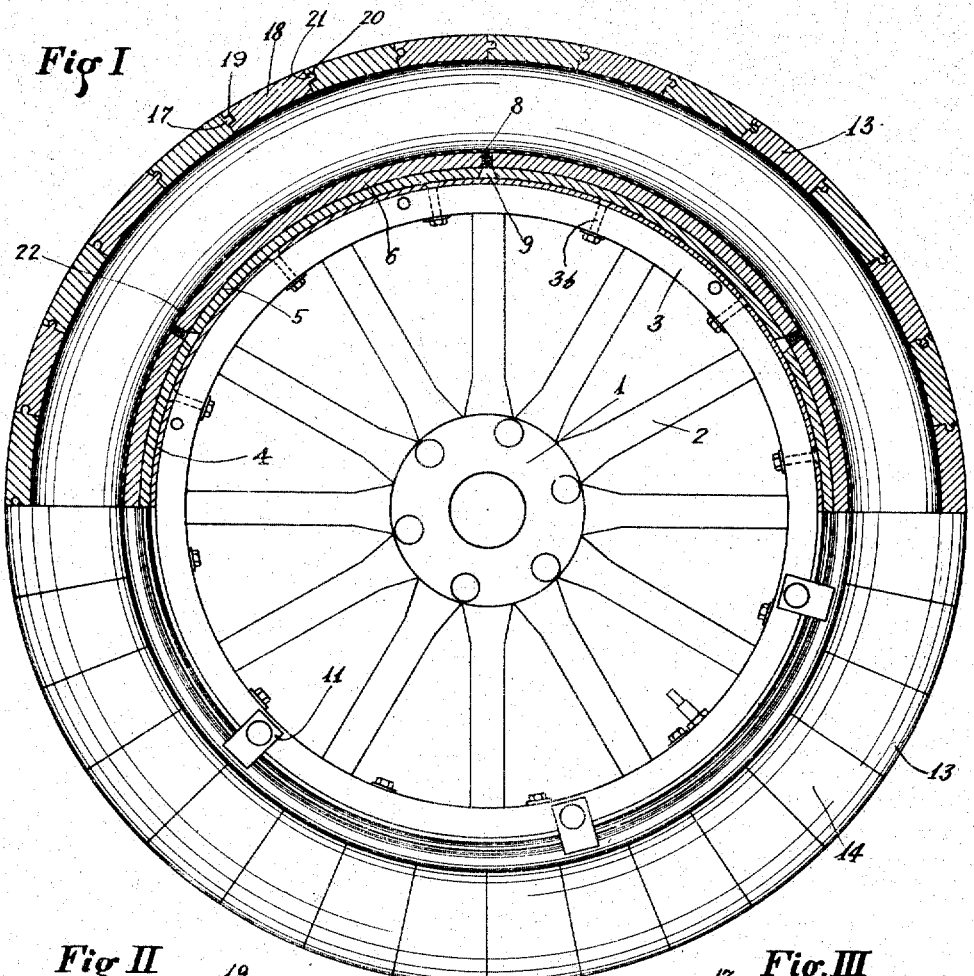
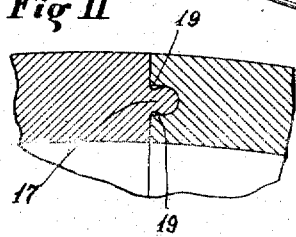
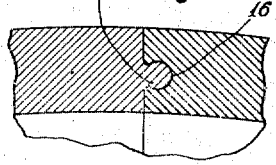
Ernest J. Oetter, Inventor
Witnesses
Carney Hartley
Elizabeth Stark.
By Mason Fenwick Lawrence,
Attorneys

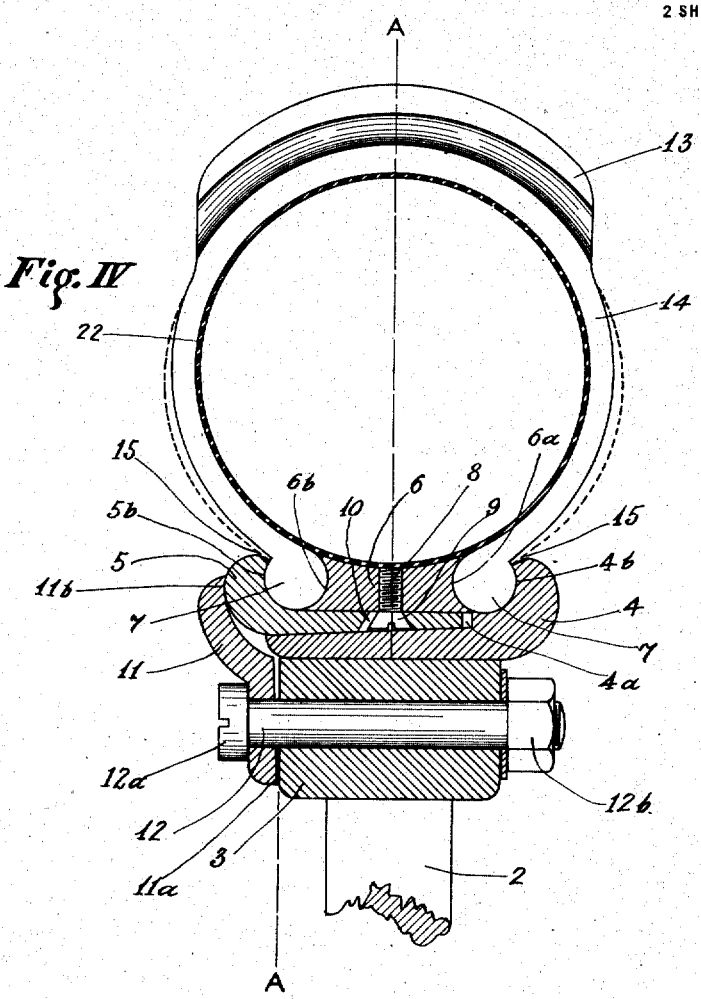

UNITED STATES PATENT OFFICE.

ERNEST J. OETTER, OF DENVER, COLORADO.

TIRE.

1,226,580. Specification of Letters Patent. Patented May 15, 1917.

Application filed March 17, 1916. Serial No. 84,871.

*To all whom it may concern:*

Be it known that I, ERNEST J. OETTER, a citizen of the United States, residing at Denver, in the county of Denver and State of Colorado, have invented certain new and useful Improvements in Tires; and I do hereby declare the following to be a full, clear, and exact description of the invention, such as will enable others skilled in the art to which it appertains to make and use the same.

This invention relates to improvements in tires and has for an object to provide a tire of steel or other similar material having a substantial but slightly resilient tread and having sides composed of sections each capable of independent resilient action.

A further object is to provide a hollow, resilient sectional tire of steel or similar material having means for preventing the entrance of water or other material thereinto.

With these and other objects in view the invention comprises certain novel constructions, combinations and arrangements of parts as will be hereinafter more fully described and claimed and as illustrated in the accompanying drawings in which similar characters of reference indicate corresponding parts throughout the several views and in which—

Figure I is a side elevation of a wheel showing, attached thereto, and partly in section on line A—A of Fig. IV, a rim and an improved tire constructed in accordance with my invention.

Fig. II is a detail of one of the master or key joints between the sections of the tire.

Fig. III is a detail of the ordinary joints between the sections.

Fig. IV is a cross-section of the felly and rim and showing in end elevation a single section of the tire in attached position in the rim.

The rim as here described may be attached to any wheel in any ordinary or usual manner, the particular method of attaching said rim to the wheel, forming no part of the present invention. For illustration, I have shown in the drawings an automobile wheel of common design having the usual hub 1, spokes 2 and felly 3.

The rim is made in two coacting parts 4 and 5 surrounded by a ring or band 6, and the base or inner part 4 is attached to the felly 3 in any suitable manner as by bolts $3^b$.

Parts 4 and 5 of the rim are designed to overlap and their overlapping portions are preferably wedge-shaped, as clearly shown at Fig. IV; a set off is provided in one of said parts, as at $4^a$, wherein the other part slidingly fits. The outer edges of the parts 4 and 5 are upturned to form hook-shaped annular flanges $4^b$ and $5^b$ for engaging the ribs 7 formed on the tire sections hereafter described.

The ring or band 6 is slidingly mounted upon the outer rim part 5 by means of screws 8, the heads 9 thereof being positioned in undercut transverse slots 10 formed in the outer part 5. The latter is retained in position by the adjusting clamp 11 secured to felly 3 by bolt 12, having any suitable heads as screw-head $12^a$ and nut $12^b$.

The interior surfaces of flanges $4^b$ and $5^b$ and likewise the sides of the band 6 are dished so that the flange $4^b$ and the adjacent side $6^a$ of the band 6, together form a circular, annular recess. A corresponding recess is formed by the flange $5^b$ and the adjacent side $6^b$ of the band 6. Within these recesses are mounted the ribs 7 of the tire sections, said ribs 7 being formed circular so as to correspond with and make a nice fit therein.

My improved tire is constructed in sections preferably of spring steel, each section being formed heavy at the tread portion 13, lighter at the sides as at 14 and with ribs 7, hereinabove referred to, at the ends. It will be evident that when the tread portion 13 of a section is depressed the side portions 14 will spring out as indicated in dotted lines at Fig. IV and that as the tread portion 13 is relieved of pressure the side portions 14 will spring back to normal position. It will also be evident that when the side portions 14 are sprung out to the dotted line position the tendency will be to cause ribs 7 to revolve slightly within their recesses. Provision is made for such revolving by terminating the hooked flanges at a point spaced away from the normal position of the side portions 14, as indicated at 15, thus allowing the ribs 7 to revolve until the sides 14 reach the dotted line position and engage the flanges.

It will be evident that any drawing together of flanges $4^b$ and $5^b$ will tend to grip ribs 7 against center band 6 which, being slidingly mounted, as above described, will automatically adjust itself to a central position and equalize the pressure on both sides thereof. Any tightening of this grip upon ribs 7 will, of course, tend to impede the revolving thereof, above described, and this will, in turn, result in stiffening the spring action of the sides 14 of the tire sections. I provide adjusting clamps 11 for this purpose as well as for its above mentioned purpose of retaining the rim-part 5 in position. Each clamp is used as a lever with one end fulcrumed on the felly as at 11ª and its opposite end 11ᵇ engaging the outer rim-part 5, the power being applied intermediately by the bolt 12 so that as nut 12ᵇ is screwed onto the bolt the clamp will be drawn toward the felly and the rim-part 5 will thus be forced toward the rim-part 4 and ribs 7 will be gripped tighter as nut 12ᵇ is advanced on bolt 12 until the desired tension on ribs 7 is secured. Thus the spring action of sides 14 may be adjusted by the movement of the nut 12ᵇ on the bolt 12.

It will be evident that upon withdrawing the bolt 12, the rim-part 5 carrying the band 6 and the tire sections, may be readily detached, the wedge shape of the rim-parts greatly facilitating such detachment. This will entirely disengage the one rib 7 from the recess between flange 4ᵇ and side 6ª of the band 6. The other rib 7 may be released by withdrawing the screws 8 and removing the band from the other rim part 5.

The tire sections are jointed together at the tread by tongue and groove joints shown in detail at Fig. III, each section being provided with a circular groove 16 at one end and a circular tongue 17 at the other end. It will be evident that the sections are put together by inserting the end of a tongue into the end of a groove and then revolving one section (or both) so that the tongue will slide into the groove lengthwise. It will also be evident that the fit of this joint is such, as clearly shown at Fig. III, that there is no appreciable give or play at the joint and when all sections are joined together the tread of the tire will be as substantial and will have substantially the same resiliency as if it were made solidly, that is, without joints.

It will be evident that when all sections but one have been placed in position, on account of the wedge shape of the sections as clearly shown at the lower portion of Fig. I, it would be difficult, if not impossible, to place the last and connecting section by the turning of the section and the sliding of the tongues and grooves together lengthwise as above described. I therefore provide a key section or master section 18 having a groove 19 with an opening of width equal to the diameter of the tongue as clearly shown at Fig. II. Also in the adjoining section I provide a similarly constructed groove 20 for accommodation of the tongue 21 of the key section 18. This construction permits the key section 18 to be forced into position directly, by simply springing the adjoining sections apart sufficiently to permit the insertion of the key section therebetween and then releasing them, when the tongue and groove of the key section will directly engage the adjoining and respective groove and tongue, thus completing the circular tire.

By constructing the tire in sections as herein described, I obtain the independent resilient action of the sides 14 of the sections which I believe to be more efficient than could be obtained by constructing said sides solidly. Also in case of injury to the tire the damaged portion may be readily removed and replaced by a new section or sections. Also by the section construction I can more easily form the side or spring portions 14 of the tire with the length of the grain of the steel running from tread to rim. This will lessen the chance of cracking the sides 14 when they are compressed and bent to the dotted line position shown in Fig. IV. Also the construction of the tire in uniform sections of a size and shape easily handled and made, is easier and more economical than the construction of such a tire of and in a solid or continuous piece of metal.

In order to prevent the entry at the joints into the interior of the tire of water or other matter, I provide an inner tube 22 of any suitable elastic material which may be inflated with air as usual in tires now in use, thus completely filling the interior of the tire and pressing tightly against and thereby keeping closed all joints therein at whatever point or to whatever extent the tire may be depressed or sprung from normal shape.

I claim—

1. In combination, a tire having the side portions thereof formed in sections of resilient material adapted to spring independently of each other, said sections having ribs, and a rim having means for gripping said ribs frictionally while permitting the partial revolution of said ribs therewithin.

2. A tire composed of sections connected by transverse tongues and grooves at the tread but unconnected at the sides, the side portions being composed of resilient material.

3. A tire made up of sections composed of spring steel, the tread portions of said sections being jointed together by transverse tongues and grooves, but the side portions thereof being adapted to spring independently of each other.

4. A tire having the side portions thereof formed in sections, each being of a single thickness of resilient material adapted to spring independently of all others, each section having ribs substantially circular in section; combined with a rim having substantially circular recesses for said ribs permitting them to revolve therein.

5. A tire having the side portions thereof formed in sections adapted to yield laterally independently of each other, each section having ribs substantially circular in section; combined with a rim having substantially circular recesses for the revoluble mounting of said ribs therein, and means for gripping said ribs within said recesses.

6. A tire having the side portions thereof formed in sections independent of each other, each section having ribs substantially circular in section; combined with a rim having substantially circular recesses for the revoluble mounting of said ribs therein, and adjustable means for gripping said ribs within said recesses.

7. In combination, a tire having the side portions thereof formed in sections of resilient material adapted to spring independently of each other, said sections having circular ribs, and a rim having means for gripping said ribs, said gripping means being adapted to permit the partial revolution of said ribs therewithin.

8. In combination, a tire having the side portions thereof formed in sections of resilient material adapted to spring independently of each other, said sections having circular ribs, and a rim having means for gripping said ribs, said gripping means being adapted to permit the partial revolution of said ribs therewithin, and means for adjusting the tensity of the grip of said means upon said ribs.

9. In combination, a tire made up of sections of spring steel, the tread portions thereof being jointed together by transverse tongues and grooves and the side portions of each section being thinner than the tread portion thereof and resilient so that they are adapted to spring transversely of the tire independently of all others, and substantially circular ribs along the inner edges of said side sections; a rim having substantially circular recesses for said ribs whereby the latter are revolubly mounted therein, and means for gripping the ribs in the recesses and adjusting the tension of the grip.

In testimony whereof I affix my signature in presence of two witnesses.

ERNEST J. OETTER.

Witnesses:
ALBERT L. VOGL,
CARLE WHITEHEAD.

Copies of this patent may be obtained for five cents each, by addressing the "Commissioner of Patents Washington, D. C."